(12) United States Patent
Tran et al.

(10) Patent No.: US 11,232,105 B2
(45) Date of Patent: Jan. 25, 2022

(54) UNIFIED METRICS COMPUTATION PLATFORM

(71) Applicant: Microsoft Technology Licensing, LLC, Redmond, WA (US)

(72) Inventors: Khai Tran, San Mateo, CA (US); Harsh Shah, Sunnyvale, CA (US); Maneesh Varshney, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 421 days.

(21) Appl. No.: 16/288,985

(22) Filed: Feb. 28, 2019

(65) Prior Publication Data
US 2020/0278969 A1  Sep. 3, 2020

(51) Int. Cl.
*G06F 7/00* (2006.01)
*G06F 16/2455* (2019.01)
*G06F 16/242* (2019.01)
*G06F 16/2453* (2019.01)
*G06F 16/2452* (2019.01)

(52) U.S. Cl.
CPC .... *G06F 16/24553* (2019.01); *G06F 16/2433* (2019.01); *G06F 16/24524* (2019.01); *G06F 16/24544* (2019.01); *G06F 16/24568* (2019.01)

(58) Field of Classification Search
CPC ......... G06F 16/24553; G06F 16/24568; G06F 16/2433; G06F 16/24544; G06F 16/24524; G06F 8/73; G06F 8/48; G06F 8/45; G06F 8/41; G06F 8/423; G06F 8/30; G06F 8/51; G06F 8/443
See application file for complete search history.

(56) References Cited

U.S. PATENT DOCUMENTS

| | | | |
|---|---|---|---|
| 2002/0100031 A1* | 7/2002 | Miranda | G06F 8/51 717/152 |
| 2014/0149969 A1* | 5/2014 | Brower | G06F 8/73 717/140 |

* cited by examiner

*Primary Examiner* — Azam M Cheema
(74) *Attorney, Agent, or Firm* — NDWE, LLP.

(57) ABSTRACT

A unified metrics computation platform decouples user-facing query languages from backend execution engines with the help of an intermediate platform-agnostic language, based on relational algebra procedural query language. The user needs to only specify the computation logic at a single place. By leveraging the intermediate language representation, the unified metrics computation platform can execute the same computation logic on multiple execution engines. The unified metrics computation platform unifies batch, nearline and interactive computations by automatically converting existing user defined batch logic into nearline logic. The user is presented with a unified view of the batch and nearline computation results.

20 Claims, 4 Drawing Sheets

UNIFIED METRICS COMPUTATION PLATFORM

TECHNICAL FIELD

This application relates to the technical fields of software and/or hardware technology and, in one example embodiment, to system and method to provide a unified metrics computation platform.

BACKGROUND

An on-line connection network system provides an environment for connecting people in virtual space. An on-line connection network system may be a web-based platform, such as, e.g., a connection networking web site, and may be accessed by a user via a web browser or via a mobile application provided on a mobile phone, a tablet, etc. An on-line connection network system may be a business-focused connection network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (Java™ Script Object Notation) or similar format. A member's profile web page of a connection networking web site may emphasize employment history and professional skills of the associated member. An on-line connection network system is also designed to present registered members with a variety of potentially relevant updates, such as information items related to job openings, industry-related publications, news, etc.

As a big data technology, an on-line connection network system employs two classes of computations that have been developed for processing large-scale datasets: batch and streaming. Batch computation provides correct, complete, but high latency, results. Streaming computation, on the other hand, offers low-latency, but often inaccurate or incomplete, results. Another approach to handling vast quantities of data is to employ data-processing architecture designed to take advantage of both batch and stream-processing methods. This approach—Lambda architecture—aims to balance latency, throughput, and fault-tolerance by using batch processing to provide comprehensive and accurate views of batch data, while simultaneously using real-time stream processing to provide views of online data. The two view outputs may be joined before they are presented to the user. Lambda architecture merges these two systems together to provide both accurate offline results and best-effort nearline results together in a single view.

Lambda architecture provides users with access to both fresh results computed by best-effort streaming engines and accurate offline results computed by reliable batch engines. Lambda architecture requires developers to create two different code bases for doing the same logic: offline code, often in declarative languages like SQL or Pig Latin, and also nearline code, often in procedural languages like Java™ Bean application programming interface (API) code. Many problems potentially arise due to this duplication: developers have to do twice as much work as needed, and it is painful to make sure two code bases are consistent during code update and maintenance. Additionally, it is not easy for non-engineer developers to write streaming applications using Java™ APIs. Java™ is a general-purpose class-based object-oriented computer-programming language first released by Sun Microsystems in 1995.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system to provide a unified metrics computation platform are described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java™-based servers and related environments, the embodiments are given merely for clarity in disclosure. Thus, any type of server environment, including various system architectures, may employ various embodiments of the application-centric resources system and method described herein and is considered as being within a scope of the present invention.

As mentioned above, traditionally, big data technology employs for processing large-scale datasets batch and streaming approaches, each of which has its own advantages and drawbacks, and the architecture that merges these two systems together requires development of two different code bases for executing the same logic, which may cause a strain on the development team and may result in inconsistencies during code update and maintenance. The technical problem of reducing the need for developing specialized code for batch and near-realtime (also referred to as nearline) processing and the technical problem of ensuring consistency between the two versions of code that performs the same task as a batch process and in nearline environment respectively are addressed by maintaining a single offline codebase and building a technology to auto-generate streaming API code from offline logic. This technical solution is termed, for the purposes of this description, a unified metrics computation platform.

The unified metrics computation platform decouples user-facing query languages from backend execution engines with the help of an intermediate platform-agnostic language, based on relational algebra procedural query language. The user needs to only specify the computation logic at a single place. By leveraging the intermediate language representation, the unified metrics computation platform can execute the same computation logic on multiple execution engines. The unified metrics computation platform unifies batch, nearline and interactive computations by automatically translating existing user defined batch logic into nearline logic. The nearline code is autogenerated from the intermediate representation (also referred to as the intermediate language plan or intermediate representation) and is production ready. The user is presented with a unified view of the batch and nearline computation results as the unified metrics computation platforms manages and hides all the operational complexity. The unified metrics computation platform achieves this by autogenerating all code and configuration needed to execute the logic, which can be easily updated, managed and deployed from a single repository. The intermediate language plan captures all the necessary computation details required for execution on different execution engines. The unified metrics computation platform also enhances the intermediate language plan with additional computation steps required to perform aggregations and decorations. These additional computations are derived directly from the declarative configuration specified by the user. Thus, the unified metrics computation platform permits users to control all aspects of execution using the declarative configuration without needing to write code, while the unified metrics computation platform automatically deploys, executes and operates the data processing pipelines. The unified metrics computation platform publishes the results of the computation to multiple downstream storage and visualization applications as specified by the user.

One example of the metrics being computed is user-engagement with a web service. For example, the desired task may be to track click through rate (CTR) with respect to a content item published by the web service, e.g., an advertisement or a curated article in an on-line connection system. In addition to or instead of tracking CTR as a measure of user-engagement, the task may be to track the number of viral actions with respect to a content item, such as shares or comments, etc. With reference to this example, a user specifies the computation logic by writing an offline script in a scripting language (also referred to as batch logic). The unified metrics computation platform automatically translates the user-defined batch logic into nearline logic expressed in a general purpose programming language that can be executed on a near-realtime engine. Another example of the metrics being computed is the revenue increase in response to a change in the user interface (UI) provided by a web service. A change in the UI may be, e.g., an additional visual control or removing an existing visual control.

In one example embodiment, the unified metrics computation platform merges batch and near-line processing while maintaining a single offline code base, where scripts (which could be, e.g., in Pig Latin, Hive, Spark, or some other scripting language) serving as the single source of truth. The unified metrics computation platform can use a distributed streaming platform for delivering new events (e.g., Apache Kafka), which are then either consumed by a nearline, asynchronous computational framework for stream processing (e.g., Samza) in the speed layer, or ingested in a distributed file system (e.g., Hadoop Distributed File System HDFS) via a distributed data integration framework (e.g., Apache Goblin) and then processed by a distributed workflow manager (e.g., Azkaban flows) in the batch layer. Batch jobs in Azkaban can be scheduled at different time granularities, from monthly, weekly, daily to hourly. A real time distributed online analytical processing (OLAP) datastore is used as the serving database. This datastore stores both nearline results and offline results and makes them appear to users as a single view, called a hybrid table. When a client makes a query to the hybrid table, the serving database automatically determines the latest timestamp where results are available in offline and then fetches and merges appropriate results from both sources together, and the merged results are returned to the client.

Offline and nearline results are parts of a time-series database table, so they will have same schemas. The only difference is the time boundary. For example, if the time boundary is set to t0, then offline results contain all records with timestamps before t0 and nearline results have all records with timestamp after t0 to current time. The merged results are a union of the offline and nearline results offline and nearline results share the same schema so nearline results can simply be appended to the offline results to form the merged results. The user sees the merged results a single unified response to their hybrid table query.

The unified metrics computation platform embodies a technology that converts offline logic (e.g., in the form of Pig Latin scripts) into nearline code (e.g., Samza streaming code with Java™ APIs). As an intermediate representation (IR) that connects offline logic and streaming Java™ code together, the unified metrics computation platform uses relational algebra provided with a dynamic data management framework (such as Apache Calcite), or a logical plan provided with a dynamic data management framework. The offline logic (scripts) is first converted into relational algebra plans and then these plans are optimized (e.g., using SQL processing techniques in Apache Calcite), after which the Java™ API code is generated.

Thus, in one example embodiment, the unified metrics computation platform converts Pig Latin scripts into Samza high level Java™ API code and Apache Beam Java™ API code, which can be executed on Samza with Samza Beam runner. In another embodiment, Spark code (in Java™/Scala APIs and Spark SQL) can be converted into Beam Java™ API code, using the methodologies described herein. Described below is an example of how a Pig Latin (Pig) script is converted into Beam Java™ API code.

The process of converting offline scripts into nearline Java™ streaming code can be split into two phases:
1. Converting offline scripts into Calcite IR plans. A converter is built to convert Pig logical plans into Calcite logical plans. Pig logical plans could be produced from Pig scripts using a parser that parses Pig scripts into Pig logical plans.
2. Generating Samza streaming code from Calcite logical plans. In some embodiments, the query processing framework in Apache Calcite is leveraged to build a Calcite-Samza planner that optimizes Calcite logical plans into Samza physical plans and then generate Java™ code from Samza physical plans and streaming configuration parameters.

There are three components that are being handled when converting Pig scripts to Calcite IR plans:
1. Schemas—converting from Pig schema into Calcite relational schema. Calcite data types are richer than Pig data types, so this conversion does not lose any precisions.
2. Expressions: expressions are used in many Pig statements, like for each, filter, join, and so on. A post-order traversal over Pig expression trees is performed to convert each Pig operands, like variable or constant, and operators, like mathematical operator or user-defined function, into corresponding relational operands and operators.

3. Relational operators: Pig logical plans are directed acyclic graphs (DAGs), where nodes are relational operators (note that the relational operators, like filter or join, are different from the expression operators discussed above). The unified metrics computation platform performs a Depth-first search (DFS) traversal on each Pig logical plan, starting from STORE nodes, and converts each Pig relational operator into one or more Calcite relational operators. For example, a Pig FILTER operator is mapped directly to a Calcite filter while a Pig COGROUP operator is mapped into a combination of Calcite aggregates, projects, and an outer join. In general, Calcite relational algebra is a superset of Pig Latin, so any feature supported by Pig Latin can be expressed in Calcite plans.

While Calcite logical plans are purely declarative, meaning that they merely describe what needs to be done, Samza physical plans specify how to implement each logical operator. For example, if what needs to be done is to join two input data sources, then, depending on the nature of each data source, the logical join can be implemented in Samza as a stream-stream join or a stream-table join. In stream-stream joins, it's possible to join two different streams, and it's also possible to perform self-joining of a single stream. The unified metrics computation platform first optimizes a logical plan into a physical plan that guides the system how to implement each relational operator. This step may be referred to as the planning step, and the framework to do that may be referred to as a planner. In some embodiments, the Calcite planner is enhanced by adding the following implementations:

1. Samza physical operators. There is a Samza physical operator corresponding to each Calcite logical operator. The physical operator provides all details needed to execute the relational operator and implements methods to generate high level API code.

2. A set of rules to convert each logical operator into the corresponding physical operator. These rules are often referred as implementation rules. Existing transformation rules in Calcite can be leveraged to convert the physical plan into a more optimized form. A transformation rule is a rule that converts an existing physical plan into a more optimized plan but still reserves the same semantic. For example, pushing a filter operator down toward leaves of the plan tree may help upstream operators to process fewer records. Also, the planner may recognize that the logical join is a self join and convert it into a stream-stream self join, where no repartition is needed because both sides are already co-partitioned by the join keys, and a smaller join window size can be set in order to save internal resources.

The Samza physical plan is then used to generate runtime API code, e.g., Beam API code. Apache Beam is a unified programming model to define and execute data processing pipelines. The API code generator performs conversions for the following three components:

1. Schemas. For example, in the scenario where the streaming runtime code works with Avro records from Kafka input streams, the relational schemas are converted into Avro schemas, Avro is a remote procedure call and data serialization framework 2. Expressions. Each relational expression is converted into one or more Java™ statements that evaluate the expression. For instance, a null-safe expression is used to make sure that any further processing on the value takes place only if it is not null.

3. Relational operators. Each Samza physical operator is mapped into one or more Java™ statements that call Beam APIs and return PCollection objects. A PCollection represents a distributed data set that your Beam pipeline operates on.

The API code generator generates configurations for finding input stream names, producing output streams, specifying timestamp field and window sizes for joins and aggregates, and so on. The result is the final Java™ class for the designated streaming application.

In some embodiments, the unified metrics computation platform is provided in the context of an on-line connection network system. For the purposes of this description the phrases "an on-line connection networking application" and "an on-line connection network system" may be referred to as and used interchangeably with the phrase "an on-line connection network" or merely "a connection network." It will also be noted that an on-line connection network may be any type of an on-line connection network, such as, e.g., a professional network, an interest-based network, or any on-line networking system that permits users to join as registered members. Each member of an on-line connection network is represented by a member profile (also referred to as a profile of a member or simply a profile). An on-line connection network system is designed to allow registered members to establish and document networks of people they know and trust professionally. The unified metrics computation platform can be used beneficially to evaluate member engagement with curated content by permitting access to nearline engagement data as well as to data collected over a period of time. The unified metrics computation platform can also be useful in A/B testing where identifying non-beneficial effects of a newly-introduced feature can be crucial in preventing potentially detrimental effects on the member engagement metrics.

A client query usually includes a timestamp range (start time and end time). When a client issues a query to a hybrid table, the query gets transformed internally into two separate queries. First, the latest available timestamp in the offline table is retrieved. The offline and nearline results are then obtained separately using the latest offline timestamp. The offline table is queried from start time to the latest offline timestamp and the nearline table is queried from the latest offline timestamp to end time. The response to the client is the union of these two results. The timestamp indicates the time at which the event occurred and is used to merge the offline and nearline results.

Figure 1:
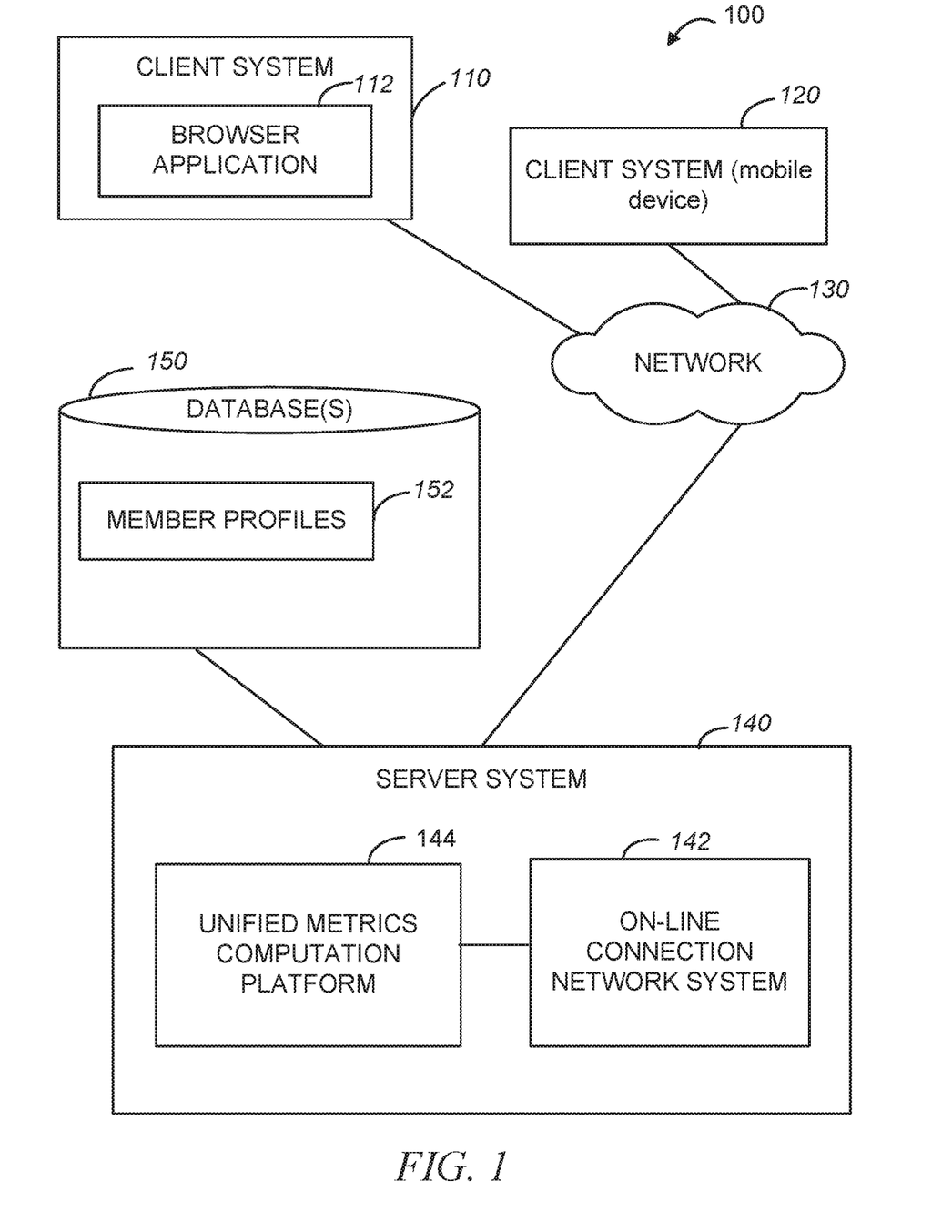
FIG. 1 is a diagrammatic representation of a network environment within which an example method and system to provide a unified metrics computation platform may be implemented.

An example unified metrics computation platform may be implemented in the context of a network environment 100 illustrated in FIG. 1. As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line connection network system 142. As explained above, each member of an on-line connection network is represented by a member profile that contains personal and professional information about the member and that may be associated with connection links that indicate the member's connection to other member profiles in the on-line connection network. Member profiles and related information may be stored in a database 150 as member profiles 152.

The client systems 110 and 120 can access the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a unified metrics computation platform 144. The unified metrics computation platform 144 is configured to auto-generate streaming API code from offline logic, by applying methodologies discussed herein. Example components of the unified metrics computation platform 144 are illustrated in FIG. 2.

Figure 2:
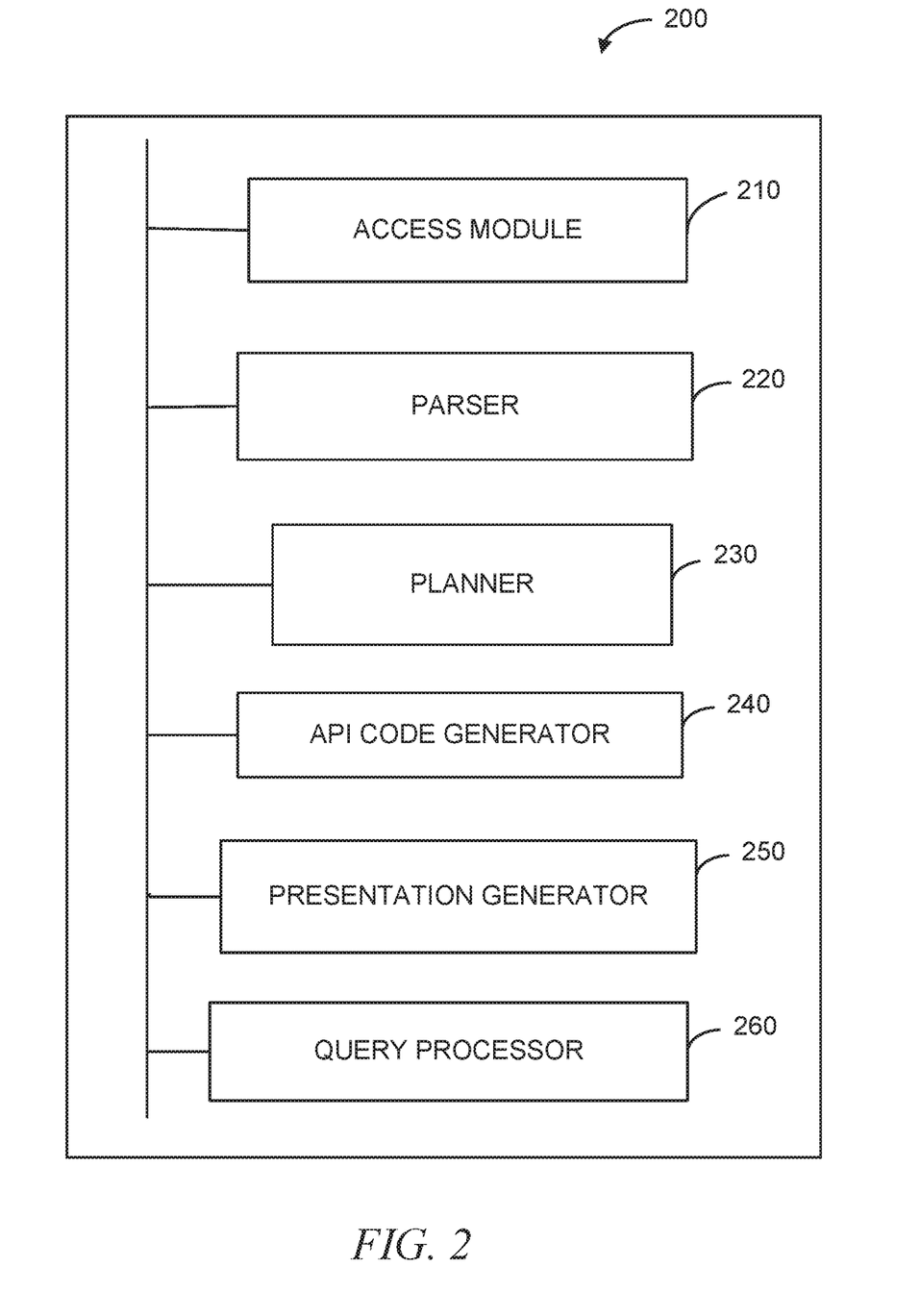
FIG. 2 is a block diagram of a system to provide a unified metrics computation platform, in accordance with one example embodiment.

FIG. 2 is a block diagram of a system 200 to provide a unified metrics computation platform in an on-line connection network. As shown in FIG. 2, the system 200 includes an access module 210, a parser 220, a planner 230, an API code generator 240, a presentation generator 250, and a query processor 260.

The access module 210 is configured to access an offline script written in a scripting language. An offline script is configured to perform a data processing task in an offline environment. The parser 220 is configured to parse the offline script and converting the offline script into a relational algebra plan. The planner 230 is configured to optimize the relational algebra plan into a physical plan. The API code generator 240, based on the physical plan, generates streaming code corresponding to the offline script. Thus generated streaming code performs the data processing task in a nearline environment. The query processor 260 is configured to detect a query with respect to the data processing task and, in response, access results produced by the offline script and also access results produced by the streaming code, such that the presentation generator 250 can generate the presentation of the results of both of offline and nearline processing in a single view. Some operations performed by the system 200 may be described with reference to FIG. 3.

Figure 3:
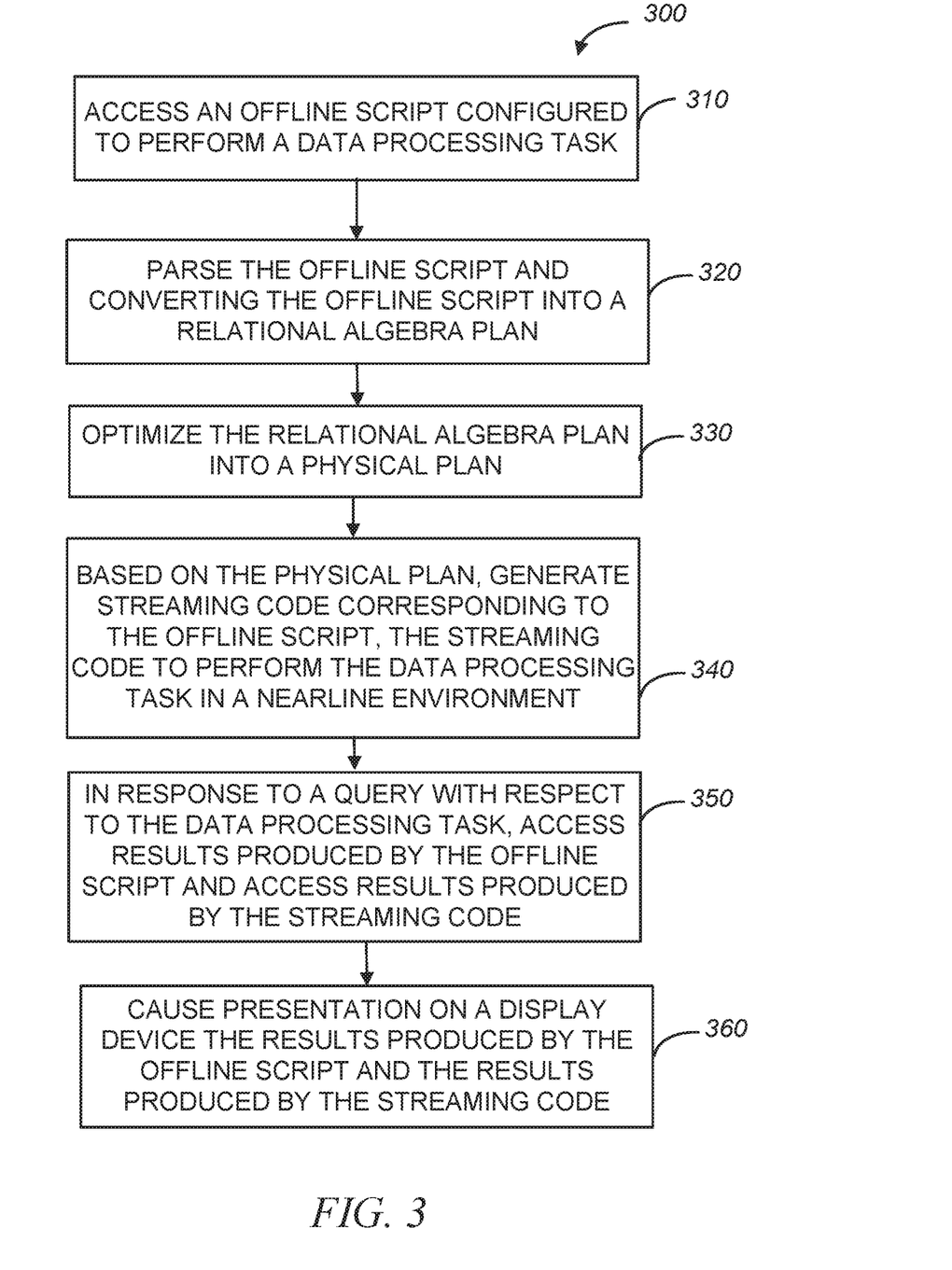
FIG. 3 is a flowchart illustrating a method to provide a unified metrics computation platform, in accordance with an example embodiment.

FIG. 3 is a flowchart of a method 300 to provide a unified metrics computation platform in an on-line connection network 142 of FIG. 1. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the access module 210 of FIG. 2 accesses an offline script written in a scripting language. At operation 320, the parser 220 of FIG. 2 parses the offline script and converts the offline script into a relational algebra plan. The planner 230 of FIG. 2 optimizes the relational algebra plan into a physical plan at operation 330. At operation 340, the API code generator 240 of FIG. 2 generates streaming code corresponding to the offline script based on the physical plan. Thus generated streaming code is stored for future execution. At operation 350, the query processor 260 of FIG. 2 detects a query with respect to the data processing task and, in response, accesses results produced by the offline script and also accesses results produced by the streaming code, such that the presentation generator 250 of FIG. 2 can generate the presentation of the results of both of offline and nearline processing in a single view at operation. The presentation generator 250 causes presentation of the results of both of offline and nearline processing at operation 360.

Figure 4:
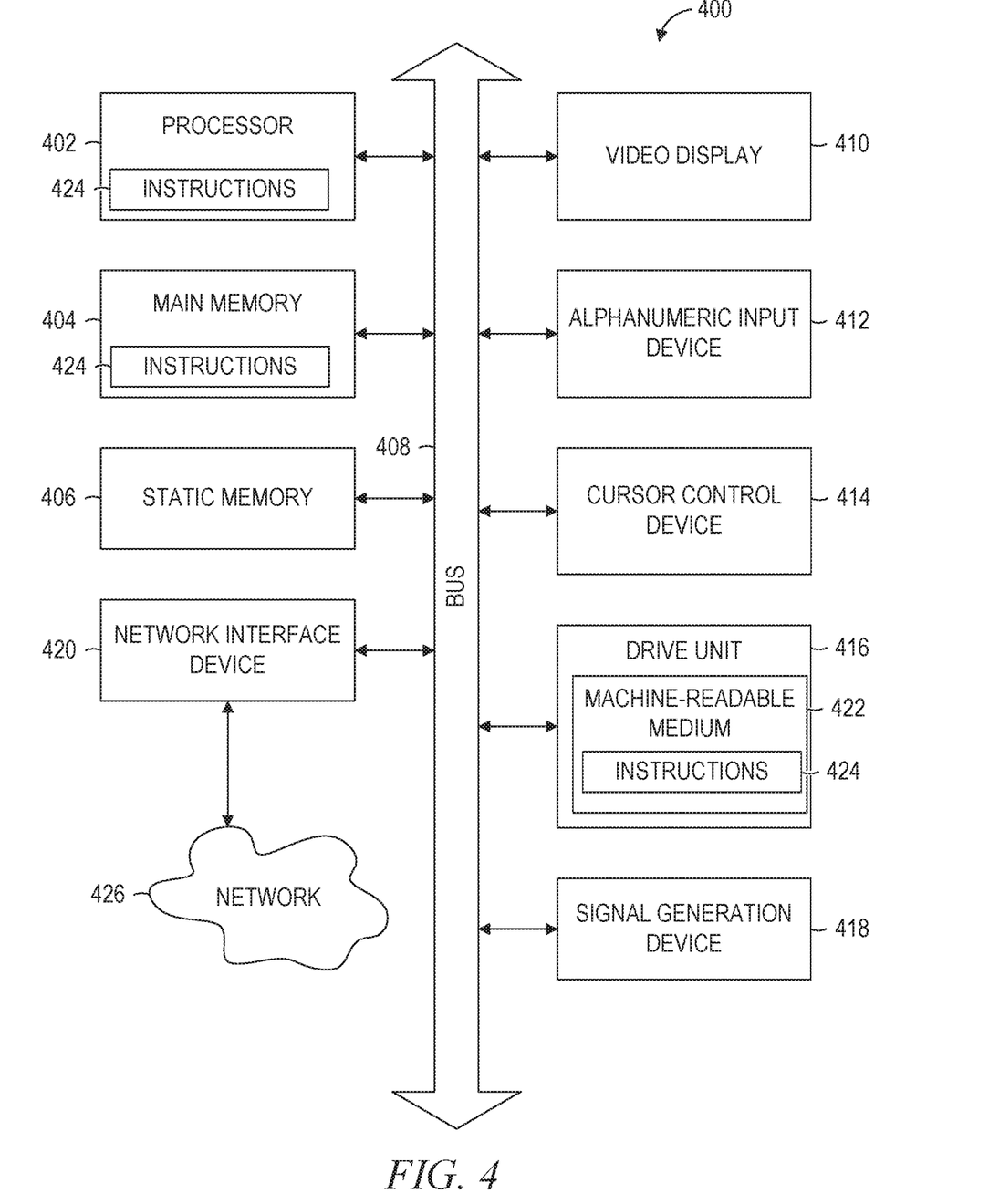
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMS), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible thing, be that a thing that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to provide a unified metrics computation platform in an on-line connection network has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer implemented method comprising:
    accessing an offline script configured to perform a data processing task, the offline script being in a scripting language;
    parsing the offline script and converting the offline script into a relational algebra plan;
    optimizing the relational algebra plan into a physical plan;
    using at least one processor, based on the physical plan, generating streaming code to perform the data processing task in a nearline environment, the streaming code corresponding to the offline script; and
    storing the streaming code;
    in response to a query with respect to the data processing task;
    accessing results produced by the offline script;

accessing results produced by the streaming code; and causing a presentation on a display device of the results produced by the offline script and the results produced by the streaming code.

2. The method of claim 1, comprising, in response to the query with respect to the data processing task:

causing the presentation on the display device to include the results produced by the offline script and the results produced by the streaming code in a single view.

3. The method of claim 1, wherein the converting of the offline script into a relational algebra plan comprises converting a schema of the offline script into a relational schema.

4. The method of claim 1, wherein the converting of the offline script into a relational algebra plan comprises converting operands and operators in the offline script into corresponding relational operands and operators.

5. The method of claim 1, comprising parsing the offline script into a logical plan in the form of a directed acyclic graph, where nodes are relational operators from the offline script.

6. The method of claim 5, comprising traversing the directed acyclic graph representing the offline script and converting each relational operator in the offline script into one or more relational algebra operators.

7. The method of claim 1, wherein the optimizing of the relational algebra plan into the physical plan comprises utilizing implementation rules to convert each logical operator in the relational algebra plan into a corresponding physical operator.

8. The method of claim 7, wherein a physical operator from the physical plan provides details needed to execute a corresponding relational algebra operator.

9. The method of claim 7, wherein the relational algebra plan comprises a logical join operator, the optimizing of the relational algebra plan into the physical plan comprises identifying the logical join operator as a self join operator and converting the logical join into a stream-stream self join operator.

10. The method of claim 1, comprising executing the streaming code concurrently with executing of the offline script.

11. A system comprising:

one or more processors; and a non-transitory computer readable storage medium comprising instructions that when executed by the one or processors cause the one or more processors to perform operations comprising:

accessing an offline script configured to perform a data processing task, the offline script being in a scripting language;

parsing the offline script and converting the offline script into a relational algebra plan;

optimizing the relational algebra plan into a physical plan;

based on the physical plan, generating streaming code to perform the data processing task in a nearline environment, the streaming code corresponding to the offline script; and storing the streaming code;

in response to a query with respect to the data processing task;

accessing results produced by the offline script;

accessing results produced by the streaming code; and causing a presentation on a display device of the results produced by the offline script and the results produced by the streaming code.

12. The system of claim 11, comprising, in response to the query with respect to the data processing task:

causing the presentation on the display device to include the results produced by the offline script and the results produced by the streaming code in a single view.

13. The system of claim 11, wherein the converting of the offline script into a relational algebra plan comprises converting a schema of the offline script into a relational schema.

14. The system of claim 11, wherein the converting of the offline script into a relational algebra plan comprises converting operands and operators in the offline script into corresponding relational operands and operators.

15. The system of claim 11, comprising parsing the offline script into a logical script in the form of a directed acyclic graph, where nodes are relational operators from the offline script.

16. The system of claim 15, comprising traversing the directed acyclic graph representing the offline script and converting each relational operator in the offline script into one or more relational algebra operators.

17. The system of claim 11, wherein the optimizing of the relational algebra plan into the physical plan comprises utilizing implementation rules to convert each logical operator in the relational algebra plan into a corresponding physical operator.

18. The system of claim 17, wherein a physical operator from the physical plan provides details needed to execute a corresponding relational algebra operator.

19. The system of claim 17, wherein the relational algebra plan comprises a logical join operator, the optimizing of the relational algebra plan into the physical plan comprises identifying the logical join operator as a self join operator and converting the logical join into a stream-stream self join operator.

20. A machine-readable non-transitory storage medium having instruction data executable by a machine to cause the machine to perform operations comprising:

accessing an offline script configured to perform a data processing task, the offline script being in a scripting language;

parsing the offline script and converting the offline script into a relational algebra plan;

optimizing the relational algebra plan into a physical plan;

based on the physical plan, generating streaming code to perform the data processing task in a nearline environment, the streaming code corresponding to the offline script; and storing the streaming code;

in response to a query with respect to the data processing task;

accessing results produced by the offline script;

accessing results produced by the streaming code; and causing a presentation on a display device of the results produced by the offline script and the results produced by the streaming code.

* * * * *